(12) United States Patent
Fithian (10) Patent No.: US 11,598,540 B2
(45) Date of Patent: Mar. 7, 2023

(54) APPARATUS AND METHOD FOR IMPROVING AIR QUALITY IN STREET CANYONS

(71) Applicant: The Board of Regents of the University of Oklahoma, Norman, OK (US)

(72) Inventor: Lee A. Fithian, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 0 days.

(21) Appl. No.: 17/501,410

(22) Filed: Oct. 14, 2021

(65) Prior Publication Data

US 2022/0034530 A1     Feb. 3, 2022

Related U.S. Application Data

(63) Continuation-in-part of application No. 16/810,184, filed on Mar. 5, 2020, now abandoned.

(60) Provisional application No. 62/814,643, filed on Mar. 6, 2019.

(51) Int. Cl.
   *F24F 7/06* (2006.01)
   *E04F 13/072* (2006.01)

(52) U.S. Cl.
   CPC ............. *F24F 7/06* (2013.01); *E04F 13/072* (2013.01)

(58) Field of Classification Search
   CPC .......... E04F 13/007; E04F 13/072; F24F 7/06
   See application file for complete search history.

(56) References Cited

U.S. PATENT DOCUMENTS

| | | | |
|---|---|---|---|
| 7,911,075 B2 | 3/2011 | Pagliasotti | |
| 7,918,061 B2 | 4/2011 | Jackson et al. | |
| 9,062,454 B1* | 6/2015 | Borgman | E04B 1/7023 |
| 10,627,134 B2 | 4/2020 | Valinejadshoubi et al. | |
| 10,662,703 B2 | 5/2020 | Ghanizadehgrayli et al. | |

(Continued)

FOREIGN PATENT DOCUMENTS

| | | |
|---|---|---|
| DE | 202016101527 U1 | 10/2016 |
| DE | 202016101528 U1 | 10/2016 |

OTHER PUBLICATIONS

Abou-Nassar, et al.: "Computational Analysis to Design Energy Efficient Built Environments," in ASME 2012 International Design Engineering Technical Conferences and Computers and Information in Engineering Conference. American Society of Mechanical Engineers (2012), pp. 177-186. http://proceedings.asmedigitalcollection. asme.org/proceeding/aspx?articleid=1736102.

(Continued)

*Primary Examiner* — Rodney Mintz
(74) *Attorney, Agent, or Firm* — Dunlap Codding, P.C.

(57) ABSTRACT

A double skin façade (DSF) for a building is disclosed. The DSF has a first façade, a second façade, and a gap extending therebetween. Movement of air is driven in an upward direction toward an upper end of the DSF, causing movement of air contaminants from a lower end of the DSF to the upper end of the DSF, and thereby enhancing the air quality of the street canyon by removing air contaminants from a street level adjacent the building. Also disclosed is a building having a DSF, and a method of enhancing air quality in a street canyon by constructing a DSF on a building.

4 Claims, 7 Drawing Sheets

(56) References Cited

U.S. PATENT DOCUMENTS

| | | | |
|---|---|---|---|
| 10,711,459 | B2 | 7/2020 | Mizuno et al. |
| 11,035,582 | B2* | 6/2021 | Poccianti .............. E04C 2/296 |
| 11,415,328 | B2* | 8/2022 | Goldstein ............. E04F 13/072 |
| 2009/0193739 | A1 | 8/2009 | Jackson |
| 2009/0320388 | A1 | 12/2009 | Lilli et al. |
| 2010/0178862 | A1 | 7/2010 | Sahm et al. |
| 2010/0257795 | A1 | 10/2010 | Pagliasotti |
| 2011/0036539 | A1 | 2/2011 | Balduini et al. |
| 2015/0034145 | A1 | 2/2015 | Fujimura et al. |
| 2017/0254550 | A1* | 9/2017 | Poccianti ................. E04B 1/74 |
| 2017/0261234 | A1 | 9/2017 | Valinejadshoubi et al. |
| 2018/0119481 | A1 | 5/2018 | Ghanizadehgrayli et al. |
| 2019/0093347 | A1 | 3/2019 | Mizuno et al. |
| 2020/0284042 | A1* | 9/2020 | Fithian .................. E04F 13/007 |
| 2021/0247077 | A1* | 8/2021 | Goldstein ............. E04F 13/072 |

OTHER PUBLICATIONS

Alkhresheh, Majdi M.; "Enclosure as a Function of Height-to-Width Ratio and Scale: Its Influence on User's Sense of Comfort and Safety in Urban Street Space," University of Florida (2007); http://ufdcimages.uflib.ufl.edu/UF/E0/01/96/76/00001/alkhresheh_m.pdf.

Boake, et al.; "The Tectonics of the Double Skin: Green Building or Just more Hi-Tech Hi-Jinx?," Waterloo: School of Architecture, (2008), http://www.academia.edu/download/31978126/tectcase.pdf.

Cui, et al.; "Numerical investigations on Re-independence for the tubulent flow and pollutant dispersion under the urban boundary layer with some experimental validations," International Journal of Heat and Mass Transfer (2017) 106:422-436.

Llewellyn, et al.; "Can Plants Really improve Indoor Air Quality," Comprehensive Biotechnology, Second Edition (2011), vol. 4, pp. 331-338, Elsevier.

Dosen, et al.; "Methodological Characteristics of Research Testing Prospect-Refuge Theory: a Comparative Analysis." Achitectural Science Review (2013), 56(3):232-241.

Fithian, Lee A.; The Double Skin Facade: Enhancing Air Quality in Urban Canyons, in Skins on Campus Bridging Industry and Academia in Pursuit of Better Buildings and Urban Habitat (2018), 1 (726):563-568; https://facadetectonics.org/wp-content/uploads/2018/03/Facade-Tectonics_2018-World-Congress_Proceedings_Vol-1_Compressed.pdf.

Fithian, et al.; "Investing in Sustainable Buildings to Enhance Community Resilience," ASCE Architectural Engineering Institute Conference Proceedings, (2017).

Kastner-Klein, et al.; "The Influence of Street Architecture on Flow and Dispersion in Street Canyons," Meterology and Atmospheric Physics; (2004) 87(1-3):121-131.

Kastner-Klein, et al.; "Wind-Tunnel Study of Concentration Fields in Street Canyons," Atmospheric Environment (Oct. 1, 1999), 33(24):3973-3979.

Larsen, et al.; "Thermal Stimulation of a Double Skin Facade with Plants," 2013 ISES Solar World Congress, Energy Procedia (2014) 57:1763-1772.

Plate, Erich J. "Methods of Investigating Urban Wind Fields—Physical Models," Atmospheric Environment (Oct. 1999) 33(24-25):3981-3989.

Pugh, et al.; "Effectiveness of Green Infrastructure for Improvement of Air Quality in Urban Street Canyons," Environmental Science and Technology (Jun. 4, 2012) 46(14):7692-7699.

Soreanu, et al.; "Botanical Biofiltration of Indoor Gaseous Pollutants—A Mini-Review," Chemical Engineering Journal (2013) 229:585-594.

Uehara, et al.; "Studies on Critical Reynolds Number Indices for Wind-Tunnel Experiments on Flow Within Urban Areas," Boundary-Layer Meterology (2003), 107(2):353-370.

Vardoulakis, et al.; "Modelling Air Quality in Street Canyons: a Review," Atmospheric Environment (2003), 37(2):155-182.

Ahmed, et al.; "Double Skin Facade: The State of Art on Building Energy Efficiency," Journal of Clean Energy Technologies (Jan. 2016) 4(1):84-89.

Poirazis, Harris; "Double Skin Facades for Office Buildings," Literature Review; Department of Construction and Architecture, Division of Energy and Building Design, Lund University, Lund Institute of Technology, (2004), 196 pages, http://www.ebd.lth.se/fileadmin/energi_byffnadsdesign/images/Publikationer/Bok-EBD-R3-G5_alt_2_Harris.pdf.

Loncour, et al.; "Ventilated Double Facades, Classification & illustration of Facade Concepts," Classification of Ventilated Double Facades, Belgian Building Research Institute, Department of Building Physics, Indoor Climate & Building Service (Oct. 2004) http://www.bbri.be/activefacades/new/download/Ventilated%20Doubles%20Facades%20%20Classification%20&%20Illustrations.dvf2%20-%20final.pdf.

Perry, et al.; "Grand Challenges for Engineering," Accessed Mar. 10, 2017; http://www.engineeringchallenges.org/File.aspx?id=11574&v=ba24e2ed.

U.S. Appl. No. 16/810,184; Fithian; Office Action dated Apr. 8, 2021; filed Mar. 5, 2020.

U.S. Appl. No. 16/810,184; Fithian; Response to Office Action filed Apr. 14, 2021; filed Mar. 5, 2020.

U.S. Appl. No. 16/810,184; Fithian; Office Action dated Apr. 21, 2021; filed Mar. 5, 2020.

* cited by examiner

| Image | Description | Pros | Cons |
|---|---|---|---|
|  | Ventilated double façade partitioned by storey with juxtaposed modules | allows partitions to isolate horizontally | vertical partitions limit efficacy of evacuating street level to one story |
|  | Multi-storey ventilated double façade | cavity is wide enough to permit access for service. Supports natural and mechanical ventilation | difficulty of access limites maintenance of each storey |
|  | Multi-storey louver naturally ventilated facade | Metal floors are installed at the level of each storey in order to allow access and maintenance | none |

APPARATUS AND METHOD FOR IMPROVING AIR QUALITY IN STREET CANYONS

CROSS REFERENCE TO RELATED APPLICATIONS

The present application is a continuation-in-part of U.S. Ser. No. 16/810,184, filed Mar. 5, 2020, now abandoned; which claims priority under 35 U.S.C. § 119(e) to U.S. Ser. No. 62/814,643, filed Mar. 6, 2019. The entire contents of each of the above-referenced patents and patent applications are hereby expressly incorporated by reference herein.

BACKGROUND

Urban Design resides at the interface of Planning, Engineering, and Architecture. The design of cities to support growing populations is a dance where planners balance zoning, policy, and legal frameworks, engineers lay infrastructure, and architects orchestrate buildings with façades that activate streetscapes where people live and work. Urban human health stands to benefit from the intersection of urban climatology and urban design. Planners are working to great effect to create a "sense of place," reduce traffic, and increase walkability. Architects develop great buildings to enhance the streetscape and "activate" communities along the streets; however, in many cases, urban climatology is taken into account only as an extreme weather event, increased wind loads, or to identify a need for building energy efficiencies. The existing inventory of buildings and streets are slowly being redesigned to accommodate more foot traffic, and new towns are being designed to counter sprawl and increase health outcomes by promoting walkability. City air quality issues caused by the buildings and street morphology—urban street canyons—are little understood and frequently overlooked during planning and design. It has become necessary to identify strategies to mitigate urban criteria air pollutants within these same urban street canyons. One method is to integrate buildings not only as effective contributors to urban streetscape but also as infrastructure to mitigate air pollutants.

In trying to make streets more walkable to boost economies and help people live healthier lifestyles, it is important to take into account that street plantings are insufficient to mitigate air pollution in a variety of urban configurations. Planners, engineers, and architects must become familiar with the ramifications of street configurations and urban form as they relate to the potential of trapped criteria air pollutants. Architects can effectively create design interventions within their building façades that can mitigate criteria air pollutants that are found in these urban street canyon configurations.

Urbanization and Air Quality Issues

As urbanization and densification increases, the microclimates of urban/higher density suburban areas change. Oke explains in *Boundary Layer Climates* (Metheun & Co. Ltd., London, $2^{nd}$ edition, 1987) that the largest source of air pollution in North America is the atmospheric boundary layer of a city caused by its morphology with pollutants produced primarily by automobiles. The pollution mix is dominated by $CO$, $CO_2$, $NO_2$, Hc, and small particulates. When sufficient sunlight is available, this leads to the development of photochemical smog and secondary pollutants such as volatile organic compounds (VOCs).

The removal of air pollutants at the street level is dependent upon air temperature stratification. Free flow of the air is important to diffusing the pollution into a larger volume. Dispersion is best when there is strong instability and deep mixing characteristics during sunny summer time conditions. The worst conditions for dispersion tend to occur where there is a temperature inversion and the boundary layer is stable. This suppresses turbulence, effectively eliminating upward motion.

Figure 1:
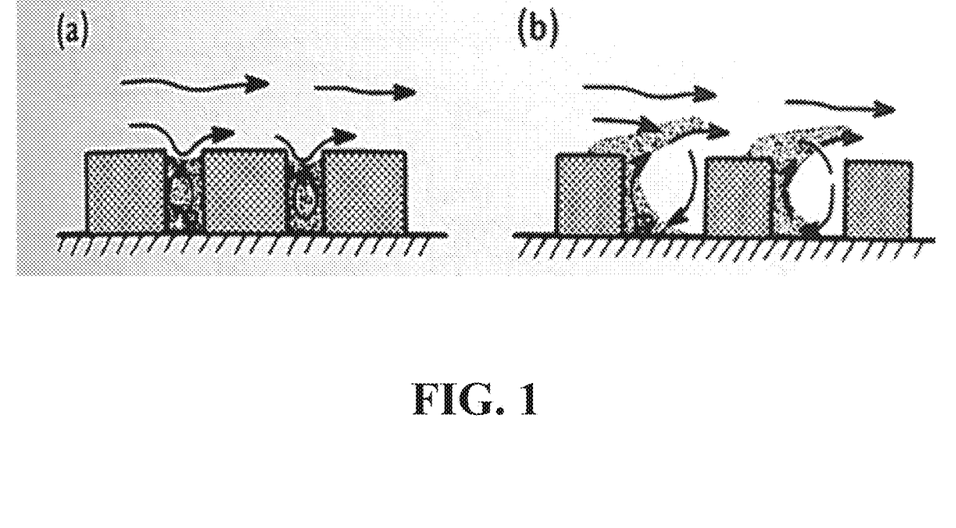
FIG. 1 is a schematic showing that in a street canyon with a narrow street between buildings (such as, but not limited to, a<1:1 height to width aspect ratio), air exchange is restricted (a), while in a street canyon with a more open arrangement (>1:1.5), the vortex circulation aids street-level flushing (b).

In areas characterized by low buildings, the exchange between street-level where car pollutants are emitted and above roof-level depends upon the ratio of the height of the buildings to the width of the street/sidewalk between the adjacent buildings. If the streets are narrow, air exchange is restricted (panel (a) of FIG. 1) as compared to that in a more open arrangement, where the vortex circulation aids street-level flushing (panel (b) of FIG. 1).

Problem Identification

Current guidelines for buildings in urban cores and the establishment of new town centers many times provide requirements for height to width ratios that shape the relationship between the building and street. This can result in an urban morphology that creates a form called an urban street canyon. According to a Wikipedia entry, a "street canyon" (also known as an urban canyon) is a place where the street is flanked by buildings on both sides, creating a canyon-like environment. Classic examples of these human-built canyons are made when streets separate dense blocks of structures, especially skyscrapers. Urban canyons affect various local conditions, including temperature, wind, air quality, and radio reception. Typically, a street canyon is a relatively narrow street with tall, continuous buildings on both sides of the road. But now the term "street canyon" is used more broadly, and the geometrical details of the street canyon are used to categorize them.

The most important geometrical detail about a street canyon is the ratio of the canyon height (H) to canyon width (W), H:W, which is referred to as the aspect ratio. The value of the aspect ratio can be used to classify street canyons as follows: (1) Regular canyon: aspect ratio ~1 and no major openings on the canyon walls, (2) Avenue canyon: aspect ratio<0.5, and (3) Deep canyon: aspect ratio ~2.

In urban design, the movement of vehicular traffic, pedestrians, and bikers governs the width ratio based upon activity within the right-of-way (ROW) between buildings. When it is considered that most New Towns are 4-6 stories (approximately 62'-74') and the predominant width of the ROW (approximately 64'-72'), the morphology of the urban canyon creates the <1:1 height to width ratio where meteorological influences including wind speed and direction create boundary layer inversions beneath the urban canopy layer. At these ratios, air pollution can become sequestered within the urban boundary layer. The problem becomes one where unhealthy places are unintentionally created. "Green Infrastructure" is assumed to offset some of the air pollution, but in actuality, street plantings, integrated building plantings, and surface mounted living walls serve only as surfaces for deposition of particulates and minor conversion of $CO_2$, they do not actually mitigate VOCs.

Design Guides for Urban Cores and Town Centers

While Form Based Codes are used to restore buildings in urban cores and establish new town centers, their height to width ratios shape the relationship between the building and street with their resulting geometry creating a form called an urban street canyon. The movement of traffic, pedestrians, and bikers governs the width ratio based upon activity within the right-of-way between buildings. In association with the CNU, the National Association of City Transportation Officials (NACTO) has created a compendium of principles and practices for Complete Streets based on the local Transect, which includes the design capacity for safe interaction of automobiles, pedestrians, bikers, multi-modal transit, and urban infrastructure.

Air pollution is being addressed world-wide. High density, high population cities are searching for guidelines and study methodologies to address growth and development and their interactions with urban climatology. The approach to study the interaction of wind, air quality, and buildings, employs two basic methodologies. In general, numerical analysis through the use of computational fluid dynamics (CFD) and wind tunnel tests are commonly used for individual building and urban wind engineering studies. The advantage of using CFD is that it is cheaper than wind tunnel tests for less demanding tasks. Validation and verification of CFD results are still necessary research issues which can be accomplished with wind tunnel studies. CFD is, however, a useful tool to give a first order quantitative graphical representation.

DETAILED DESCRIPTION

One method of mitigating urban criteria air pollutants and addressing urban health concerns while working within the guidelines established to address increasing urbanization is to utilize buildings as effective contributors to urban streetscape and green infrastructure. Buildings are interconnected with urban infrastructure, thereby serving as a resource and not just a load. For example, regenerative building façades can interact with the streetscape component. The present disclosure describes the use of a double skin façade (DSF) on a building to remediate environmental pollutants beyond the building perimeter.

In at least one non-limiting embodiment, the present disclosure is directed to a building having a capability of enhancing quality of the air adjacent the building, wherein the building has a double skin façade (DSF), wherein the DSF has (1) a first façade and a second façade facing and substantially parallel to the first façade, (2) an upper end and a lower end, and (3) a gap between the first façade and the second façade extending from the lower end to the upper end. In certain particular (but non-limiting) embodiments, the DSF further includes at least one mechanical ventilator (such as, but not limited to, a fan) positioned adjacent or near the upper end of the DSF (with the term "near" generally being defined in this instance as being within, for example, about 0 feet to about 20 feet); when the at least one mechanical ventilator is in an operating mode, it drives movement of air in an upward direction toward the upper end of the DSF causing movement of air contaminants from the lower end of the DSF to the upper end of the DSF, thereby enhancing the air quality adjacent the building by removal of the air contaminants from a street level adjacent the building. The street canyon having the building may have an aspect ratio of at least about 1.0, or at least about 1.5, for example.

In at least one non-limiting embodiment, the present disclosure is directed to a method of enhancing air quality in a street canyon including the steps of (a) constructing a double skin façade (DSF) on a building, wherein the DSF is any of the DSF's described or otherwise contemplated herein; and (b) causing the at least one mechanical ventilator of the DSF to be in an operational mode, whereby movement of air is driven in an upward direction toward the upper end of the DSF, causing movement of air contaminants from the lower end of the DSF to the upper end of the DSF, thereby enhancing the air quality of the street canyon by removing air contaminants from a street level adjacent the building. The street canyon having the building may have an aspect ratio of at least about 1.0, or at least about 1.5, for example.

In certain particular (but non-limiting) embodiments, the DSF used in the method has (1) a first façade and a second façade facing and substantially parallel to the first façade, (2) an upper end and a lower end, (3) a gap between the first façade and the second façade extending from the lower end to the upper end, and (4) at least one mechanical ventilator (such as, but not limited to, a fan) positioned adjacent or near the upper end of the DSF.

Before describing various embodiments of the present disclosure in more detail by way of exemplary description, examples, and results, it is to be understood that the embodiments of the present disclosure are not limited in application to the details of methods and compositions as set forth in the following description. The embodiments of the present disclosure are capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the presently disclosed inventive concepts may be practiced without these specific details. In other instances, features which are well known to persons of ordinary skill in the art have not been described in detail to avoid unnecessary complication of the description.

Unless otherwise defined herein, scientific and technical terms used in connection with the embodiments of the present disclosure shall have the meanings that are commonly understood by those having ordinary skill in the art.

Further, unless otherwise required by context, singular terms shall include pluralities and plural terms shall include the singular.

All patents, patent applications (including U.S. Provisional Application Ser. No. 62/814,643, filed Mar. 6, 2019 and U.S. Non-Provisional application Ser. No. 16/810,184), patent application publications, and non-patent publications mentioned in the specification are indicative of the level of skill of those skilled in the art to which embodiments of the present disclosure pertain. All patents, published patent applications, and non-patent publications referenced in any portion of this application are herein expressly incorporated by reference in their entirety to the same extent as if each individual patent or publication was specifically and individually indicated to be incorporated by reference.

While the apparatus and methods of the embodiments of the present disclosure have been described in terms of particular embodiments, it will be apparent to those of skill in the art that variations may be applied to the apparatus and/or methods and in the steps or in the sequence of steps of the method described herein without departing from the spirit and scope of the inventive concepts. All such similar substitutes and modifications apparent to those of skilled in the art are deemed to be within the spirit and scope of the inventive concepts as defined herein.

As utilized in accordance with the apparatus and methods of the embodiments of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y, and Z" will be understood to include X alone, Y alone, and Z alone, as well as any combination of X, Y, and Z.

As used in this specification and claim(s), the words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the terms "about" or "approximately" are used to indicate that a value includes the inherent variation of error. Further, in this detailed description, each numerical value (such as, but not limited to, time or frequency) should be read once as modified by the term "about" (unless already expressly so modified), and then read again as not so modified unless otherwise indicated in context. The use of the term "about" or "approximately" may mean a range including ±1%, or ±5%, or ±10%, or ±15%, or ±25% of the subsequent number unless otherwise stated.

As used herein, the term "substantially" means that the subsequently described event or circumstance completely occurs or that the subsequently described event or circumstance occurs to a great extent or degree. For example, the term "substantially" means that the subsequently described event or circumstance occurs at least 90% of the time, or at least 95% of the time, or at least 98% of the time.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Also, any range listed or described herein is intended to include, implicitly or explicitly, any number within the range, particularly all integers, including the end points, and is to be considered as having been so stated. For example, "a range from 1 to 10" is to be read as indicating each possible number, particularly integers, along the continuum between about 1 and about 10. Thus, even if specific data points within the range, or even no data points within the range, are explicitly identified or specifically referred to, it is to be understood that any data points within the range are to be considered to have been specified, and that the inventors possessed knowledge of the entire range and the points within the range. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Reference to a series of ranges includes ranges which combine the values of the boundaries of different ranges within the series. Thus, to illustrate reference to a series of ranges, for example, of 1-10, 10-20, 20-30, 30-40, 40-50, 50-60, 60-75, 75-100, 100-150, 150-200, 200-250, 250-300, 300-400, 400-500, 500-750, 750-1,000, includes ranges of 1-20, 10-50, 50-100, 100-500, and 500-1,000, for example.

In certain embodiments, the aspect ratio of the urban street canyon, i.e., of canyon height to canyon width (average building height:average street+sidewalk width, i.e., "H:W") is in a range of about 0.5 to about 2 or greater, such as, but not limited to, from about 0.5 to any of about 0.6, about 0.7, about 0.75, about 0.8, about 0.9, about 1.0, about 1.1, about 1.2, about 1.3, about 1.4, about 1.5, about 1.6, about 1.7, about 1.8, about 1.9, about 2.0, about 2.5, about 3.0, about 4, about 5, about 6, about 7, about 8, about 9, about 10, or greater.

Figure 3:
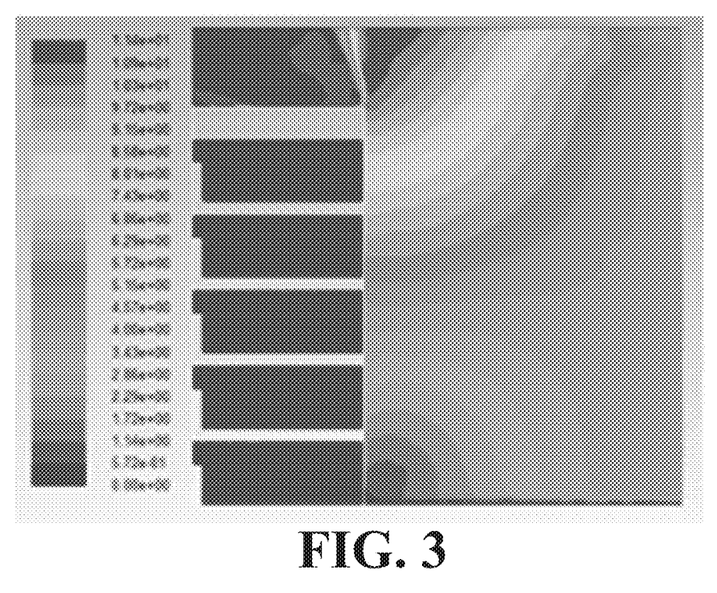
FIG. 3 shows a velocity profile for a building without a double skin façade (DSF).
Figure 4:
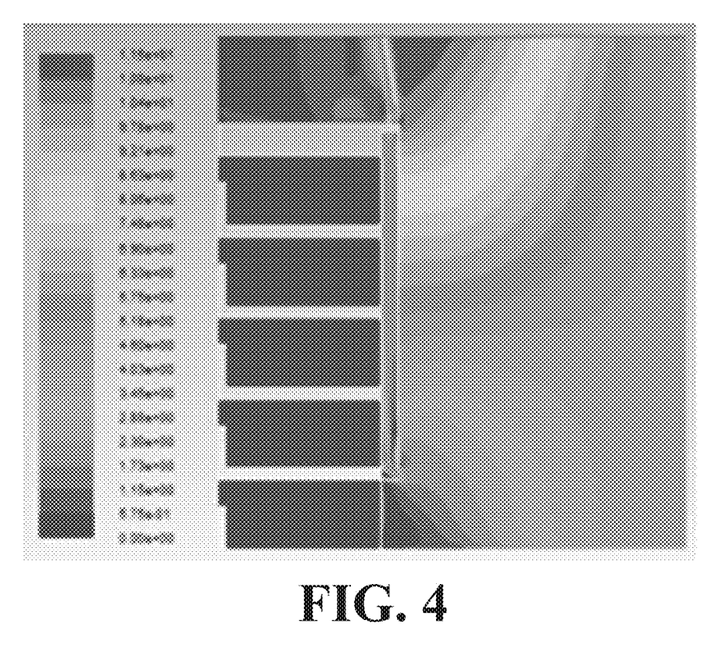
FIG. 4 shows a velocity profile for a building with a DSF.

Returning now to the various non-limiting embodiments of the present disclosure, as shown herein, a modified double skin façade (DSF) is utilized on a building in an urban street canyon to influence flow and pollutant dispersion, thereby enhancing air quality in the urban street canyon. The modified DSF utilizes ventilation means (for example, but not by way of limitation, fans or the HVAC system of the building itself) placed at various points within or near an open periphery of the DSF to increase the draw-through of air from a lower portion of the DSF to the open upper end of the DSF. FIG. 3 shows the velocity profile for a building without a DSF and recirculating flow at street level. FIG. 4 shows the velocity profile for a building with a DSF showing the flow entering through the bottom of the DSF and exiting at building roof level (approx. 60 ft) enhancing the opportunity of turbulence and mixing. Thus, the work described herein showed that the velocity profile for a building with a DSF can interact with street level ventilation even without additional apparatus for providing ventilation.

Numerical Analysis

The use of FLUENT is a recognized CFD software, universally acknowledged for energy, temperature, and flow analysis. Previous studies that showed the interaction of building façades and in particular double-skin façades (DSF) with the streetscape were based upon the twin face type of a DSF configuration that heavily relied upon natural convection, where any fluid motion is caused by natural means such as the buoyancy effect. The buoyancy effect, similar to the chimney effect, is marked by warmer fluid rising and cooler fluid liquid falling. However, in the present disclosure, FLUENT was found to be incapable of allowing for the introduction of a secondary air contaminant source. This did not allow the FLUENT CFD software to be used to evaluate criteria pollution transport through the DSF.

It was identified that only flow analysis needed to be performed. An alternative CFD was identified, which utilized a very simplistic CFD application (Algorizk, Wind Tunnel). This CFD performs its simulations by assuming an incompressible and homogeneous fluid and performing analysis with Navier Stokes equations in a very simple 120×180 grid velocity field. This simplistic structure allowed for CFD modeling that included attributes that could combine urban canyon morphology, façade integrated DSF geometry, secondary flow sources, and wind speed necessary to identify mixing. This software did not, however, provide material and fluid interactions nor scalable dimensional data. Hence, wind tunnel simulations were performed to validate results.

Wind Tunnel Analysis

Wind tunnel analysis is typically used in urban air pollutant dispersal studies. It is important to note that urban boundary layer studies take into account Reynolds roughness factors. It has been found that there is Reynolds-number independence of turbulent flow and pollutant dispersion in scaled building models. Reynolds-number independence can be expected to model urban areas as long as the critical values of roughness and height separation of the flow from the model were satisfied. It has been shown that wind tunnel studies correspond well to results obtained in the atmosphere by means of large eddy simulations so that they can be used with confidence for modelling urban situations. Typically, an urban boundary layer wind tunnel simulation will also include a fetch of roughness elements. The wind tunnel available for the present disclosure was adapted to include elements that simulated urban boundary layer conditions.

Double Skin Façades—Evaluation and Selection

While the understanding of the capacity of the DSF to evacuate air at the street level within the zone of influence is fundamental, there remains the issue as to whether this could actually remove criteria pollutants from the streetscape where human interaction is being promoted.

Figure 5:
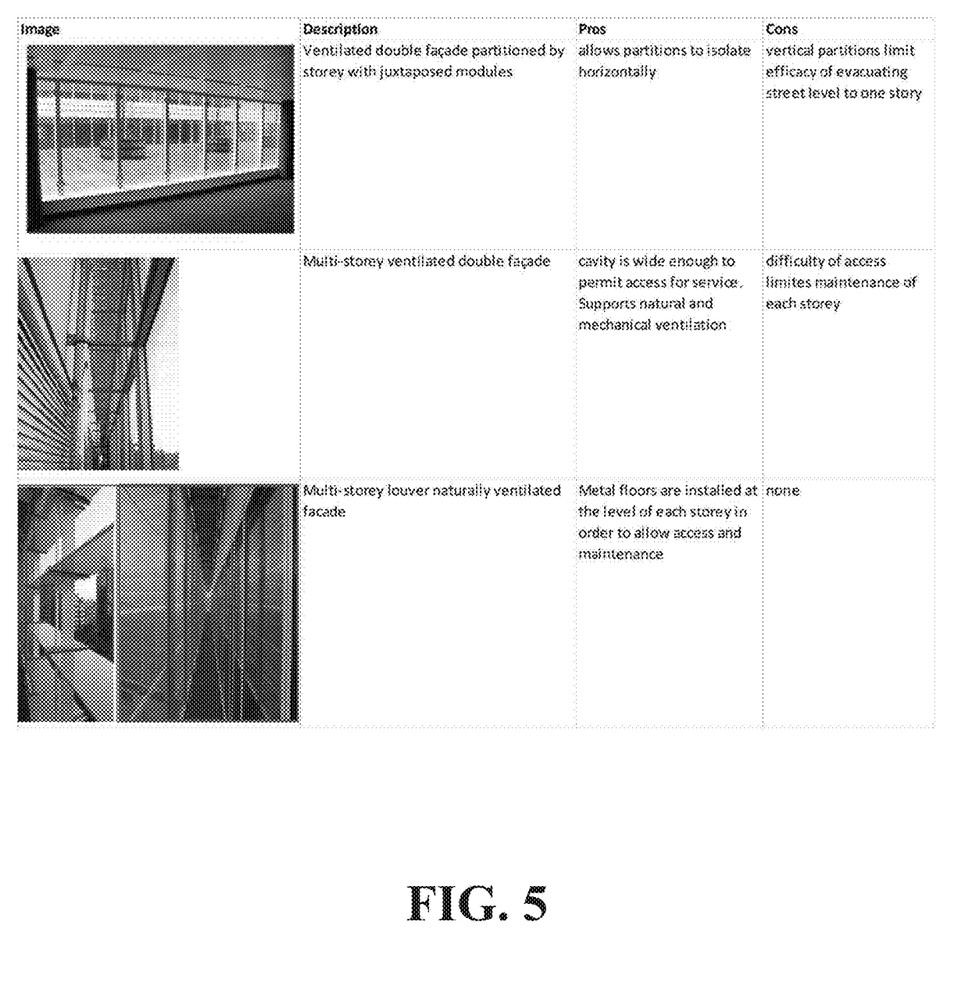
FIG. 5 shows the types of partitioning of DSFs with pros and cons regarding their efficacy for interfacing with the street level and potential for providing natural ventilation.

Identifying the configuration of a DSF that is best suited for supporting an integrated filtration system has been carried out in a previous study (Abou-Nassar, Guy, Zahed Siddique, and Lee Fithian. "Computational Analysis to Design Energy Efficient Built Environments." In *ASME 2012 International Design Engineering Technical Conferences and Computers and Information in Engineering Conference,* 177-186. American Society of Mechanical Engineers, 2012). The various definitions of DSF are characterized and described in the Belgian Building Research Institute publication "Ventilated Double Skin Façades" (Loncour, X., Deneyer, A., Blasco, M., Flamant, G., Wouters, P., "Ventilated Double Skin Façades, Classification & Illustration of Façade Concepts," AIVC-CR03, 2005). The classification takes into account the modes of how the façades work and introduces three criteria which are independent of one another: 1) the type of ventilation (natural, mechanical, and hybrid ventilation); 2) the partitioning of the façade; and 3) the modes of ventilation of the cavity. The types of partitioning of the façade (FIG. 5) with pros and cons regarding their efficacy for interfacing with the street level and potential for providing natural ventilation are described herein below.

Figure 6:
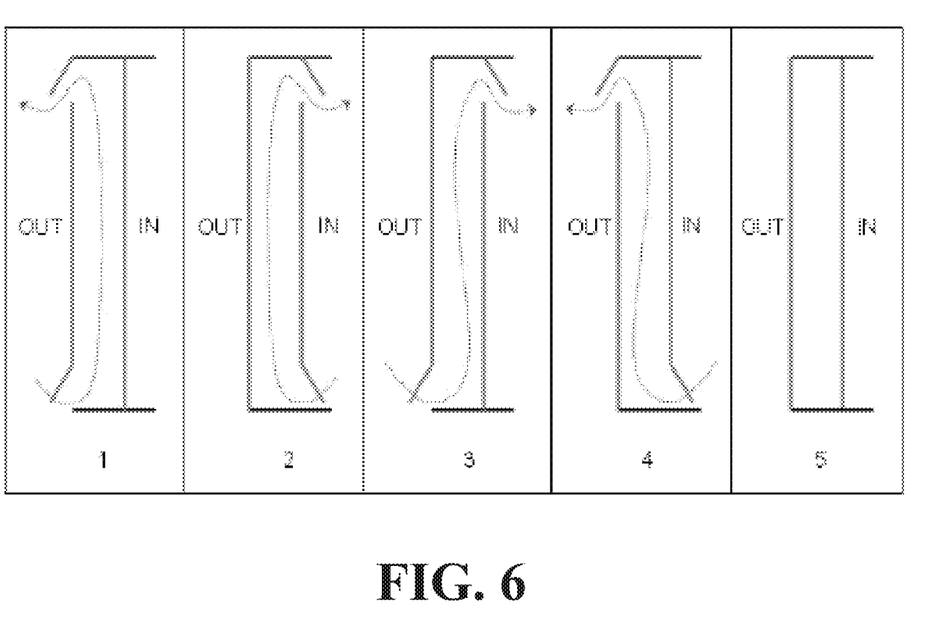
FIG. 6 is a schematic showing five ventilation technology types.

Five ventilation technology types were identified (FIG. 6) with the findings indicating only modes 1 and 3 being able to address street level air zones.

There are numerous ventilations systems associated with DSF, and this research isolated one for study due to how the airflow interacted at the streetscape level. Two classification systems were identified, British and North American. In the British system, there are five primary types based on commonality of façade:

Category A: Sealed Inner Skin: subdivided into mechanically ventilated cavity with controlled flue intake versus a ventilated and serviced thermal flue;

Category B: Openable Inner and Outer Skins: subdivided into single story cavity height versus full building cavity height;

Category C: Openable Inner Skin with mechanically ventilated cavity with controlled flue intake;

Category D: Sealed Cavity, either zoned floor by floor or with a full height cavity; and Category E: Acoustic Barrier with either a massive exterior envelope or a lightweight exterior envelope.

In the American system, there are three basic system types: Buffer System, Extract Air System, and Twin Face System. The present disclosure includes integrated biofilters to assist in the removal of criteria air pollutants.

EXPERIMENTAL DESIGN AND ANALYSIS

Double skin façade airflow perpendicular to the urban canyon was modeled as this was the most extreme system exhibiting the least amount of mixing. The model included windward and leeward applications of the system, to determine airflow ventilation. When decoupled from the building environmental volumes and buoyancy effects, it was established that mechanically assisted ventilation was necessary. All analysis was conducted visually through video capture. The formation of a street canyon vortex was taken as an initial condition and subsequent removal of the tracer smoke source as evidence of evacuation.

CFD Analysis of the DSF and Urban Street Canyon

The data from the CFD software yielded preliminary results that determined the technology was sufficient to producing mixing and evacuation at the streetscape level.

Figure 2:
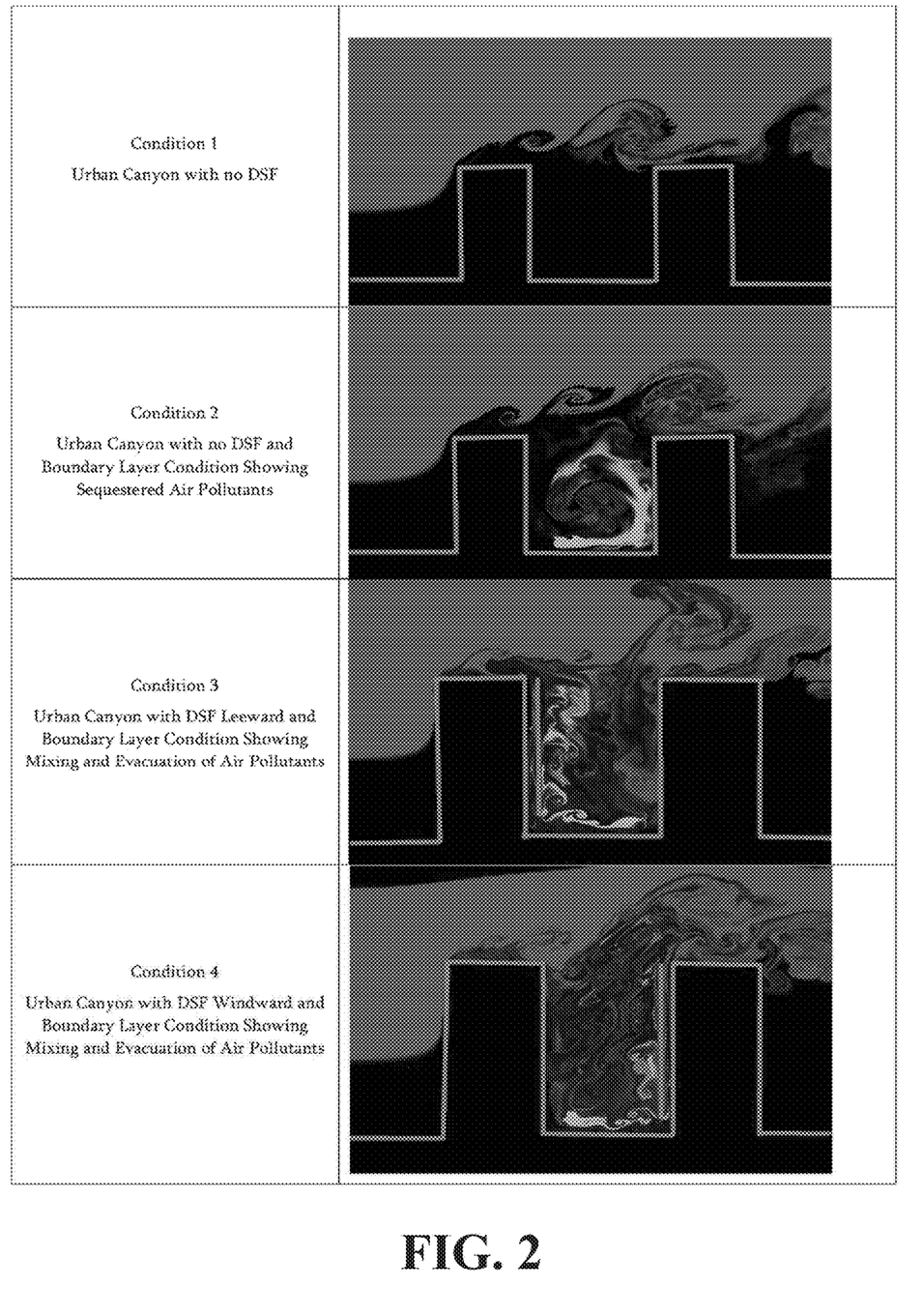
FIG. 2 contains photographs showing wind tunnel results which illustrate the four conditions of the relationship between a street canyon and the perpendicular airflow therein.

FIG. 2 illustrates the summary conditions of the relationship between the urban canyon and the perpendicular airflow. Condition 1 illustrates a skimming flow regime that occurs over urban canyons and is demonstrated by the visualization of the airflow and simple urban forms with streetscape in the CFD application. Condition 2 illustrates the sequestered condition that occurs in the urban canyon as the skimming regime that creates the boundary layer and does not interact with the streetscape air source. Condition 3 illustrates the introduction of a leeward side DSF with mechanical ventilation assist, demonstrating mixing of the boundary air and evacuation of the streetscape air source. Finally, Condition 4 illustrates the introduction of a windward side DSF with mechanical ventilation assist, demonstrating mixing of the boundary air and evacuation of the streetscape air source.

Wind Tunnel Analysis of the DSF and Urban Street Canyon

The experiments were performed in the OU AME Student Wind Tunnel (see FIG. 11 of U.S. Provisional Ser. No. 62/814,643). The wind tunnel has a test section with dimensions 36"×36"×36". In the wind tunnel, a scaled analogue of the stratified boundary-layer flow was reproduced. The boundary layer depth varied with each of the experiments. Maximum flow speed in the tunnel was 3.76 m/s. For all studies, the height of the buildings forming the canyon was 12 cm, and the length was 60 cm. The distance between the buildings was chosen to be 12 cm. This corresponds to the canyon aspect ratio equal to 1 and to the length-to-depth ratios equal to 5 for a short canyon. In all experimental configurations, the external wind flow was directed perpendicular to the axis of the canyon seen as green laser axis.

The boundary layer was generated at the entrance to the test section by two panels at the inlet and extending just to the test section. The vertical profile was approximately 26 cm.

The investigated street canyon followed the experimental setup in "Wind-tunnel Study of Concentration Fields in Street Canyons" (Kastner-Klein, P, and E. J Plate. "Wind-Tunnel Study of Concentration Fields in Street Canyons." *Atmospheric Environment* 33, no. 24 (Oct. 1, 1999): 3973-79). The geometric model scale calculated as the ratio of the model building height H=12 cm to typical average building heights in urban areas. Street width was 12 cm. The block length was 60 cm. A ceiling mounted collimated laser was used to maintain geometric alignment of the model and center the DSF within the test section. The laser also highlighted that portion of the air contaminant vortex turbulence for photographic capture.

Flow measurements in the tunnel were conducted using a hotwire anemometer. Turbulence characteristics were captured photographically to determine whether the simulated DSF was interacting with air sources within the canyon and evacuating. In parallel to the flow and turbulence captures, multiple types of passive tracer gases were used to simulate sequestered pollutants and buoyancy characteristics within the urban canyon. Ambient temperature within the testing area was approximately 90° F. (32° C.).

At a 1:200 scale, the DSF was simulated by a scaled opening (1.25 cm×4 cm) in the middle of the block at the base of the "building" block and another matching opening (1.25 cm×4 cm) at the top. The intent was to mimic a full-faced DSF across a typical building (lot size 50 feet) mid-block.

The typical DSF comprises a gap about 36" wide. At 1:200 scale, this would have been too small to be effectively modeled; hence, the bottom and top openings were chosen to simulate the effect. Loss of fan efficiency due to the small openings necessitated the larger fan seen in the middle of the model. The fan was coupled to a rheostat, and flow speeds were measured with a hotwire anemometer. The inlet and outlet speeds of the simulated DSF are shown in Table 1. Differences in ¾ speed and full speed are minimal due to pressure loss between the blocks. All studies were conducted with DSF operating at full speed.

TABLE 1

Inlet and Outlet Speeds of the Wind Tunnel

| | Inlet (m/s) | Outlet (m/s) |
|---|---|---|
| Quarter speed | 3.1 | 0.81 |
| Half speed | 4.32 | 1.04 |
| Three quarter speed | 5.03 | 1.53 |
| MAX | 5.03 | 1.30-1.53 |

Results and Discussion

Wind Tunnel Video Results

Test 1 utilized vaporized water and a glycol-based fluid. The vapor machine was placed to inundate the urban canyon to determine max times for evacuation. Wind Tunnel speed was set at 3.76 m/s. Flow speed of the DSF was set at MAX.

Test 2 utilized dry ice vapor to simulate a trapped boundary layer condition. Hot smoke sources exhibited too much buoyancy even with ambient temperatures of 90° F. The dry ice container was placed offset to the DSF to show evacuation of pollutants generated at locations furthest from the DSF. Wind Tunnel speed was set at 3.76 m/s. Flow speed of the DSF was set at MAX.

Test 3 utilized a cold smoke generator to simulate a trapped boundary layer condition. Hot smoke sources exhibited too much buoyancy even with ambient temperatures of 90° F. The smoke source was offset to the DSF to show evacuation of pollutants generated at locations furthest from the DSF. Wind Tunnel speed was set at 3.76 m/s. Flow speed of the DSF was set at MAX.

In Test 4, due to extremely variable speeds within the wind tunnel, which affected the development of the boundary layer, an extreme test was set up using a jet source to achieve higher speeds (10 m/s) at 23 cm above the street level of the DSF. Dry ice vapor was used to simulate a trapped boundary layer condition. The dry ice container was placed offset to the DSF to show evacuation of pollutants generated at locations furthest from the DSF. A boundary layer jet funneled glycol vapor for visual identification of separation. Wind Tunnel speed was set at 0 m/s. Flow speed of the DSF was set at MAX.

Test 5 utilized a hot smoke tracer source similar to an HVAC ventilation tracer (wax impregnated cloth). The hot smoke source was placed inside the DSF to demonstrate that the pollutants were not being removed from the streetscape merely by lift generated by the Bernoulli principle. Wind Tunnel speed was set at 3.76 m/s. Flow speed of the DSF was set at MAX.

DISCUSSION

Although many of the variables of the wind tunnel operation were less than ideal, what was consistent throughout all the tests was that the DSF evacuated the urban street canyon. Due to the nature of the simulated pollutant sources, and the scale with which the DSF had to function (1:200), the pollutant sources were not able to be visually traced after entering the DSF inlet, as they were dissipated by the fan within the model.

In Test 1, a video named "Hot Smoke Works" was created of length 1:15. Vaporized water and glycol-based fluid was used with a 400 W fog machine to simulate the pollutant source. At time 0:04, the DSF Fan was turned on, and at approximately 0:21, mixing was observed. Additional smoke was generated due to the nature of the machine generating the smoke at 0:22, 0:26, 0:28, and 0:42 time marks. The canyon vortex began to form at time mark 0:31, the vortex flow and movement toward the DSF was visible at 0:34, and at 0:38, the vortex flow was still visible; however, it is apparent that the DSF was clearing the canyon. At 0:50, the canyon was cleared and skimming can be seen, and at the 0:54 time mark, the model canyon was cleared and skimming continues.

In Test 2, a video named "Dry Ice Vapor Works" was created of length 0:55. Dry Ice with a boundary layer was produced at 3.8 m/s. At the 0:05 time mark, the dry ice vapor can be seen gathering in the model canyon; this is further shown at the 0:10 time mark. At the 0:15 time mark, the DSF was turned on, and dry ice vapor can be seen entering the DSF, which is further shown at the 0:16 time mark. At the 0:21 time mark, the DSF was still on, and the dry ice vapor was still seen entering the DSF. At the 0:38 mark, the DSF fan was turned off, and as the fan slows, the dry ice vapor was seen filling the model canyon again.

In Test 3, a video named "Cold Smoke Works" was created of length 0:29. A piece of equipment that burned wood chips and then cooled the smoke was used in the urban canyon model within the wind tunnel boundary layer. At the 0:02 time mark, the cold smoke was seen entering the canyon. At the 0:05 time mark, the cold smoke can be seen continuing to fill the model canyon, and at the 0:07 time mark, the smoke can be seen starting to develop the recirculation vortex. At the 0:09 time mark, the smoke was continuing to fill the model canyon, and recirculation of the vortex was readily apparent. The DSF fan was turned on at the 0:12 time mark, and it can immediately be seen that the recirculation vortex was breaking up and entering the DSF. At time marks 0:14 and 0:16, the recirculation continued to break up, entering the DSF and dissipating. At time mark 0:20, recirculation of the cold smoke was almost completely cleared, and the remaining smoke being generated was being drawn toward the DSF. At time mark 0:27, recirculation of smoke was cleared, and the DSF was turned off.

In Test 4, a video named "Overall Viz" was created of length 0:50. Dry Ice with a simulated boundary layer jet of 10 m/s was used. This was due to extremely variable speeds within the wind tunnel, which affected the development of the boundary layer. Dry Ice Vapor was used to simulate the urban street canyon vortex condition. The boundary layer jet funneled glycol vapor for visual identification of separation. At time mark 0:02, the dry ice vapor can be seen gathering in the model canyon. At time mark 0:05, the boundary layer jet can be seen. At time mark 0:16, the DSF was turned on, and the dry ice vapor can be seen entering the DSF along with slight boundary layer smoke mixing. At time mark 0:21, the DSF fan remained on, and the dry ice vapor can be seen entering the DSF along with more boundary layer smoke mixing. At time mark 0:28, the DSF fan remained on, and the dry ice vapor was seen entering the DSF along with the model canyon being cleared. At time mark 0:38, the DSF fan was turned off. At time mark 0:40, the DSF fan was off, and dry ice vapor can be seen gathering in the model canyon.

In Test 5, a video named "Inside Wall Works Only with Fan" was created of length 0:32. For this video, a hot smoke tracer source was used similar to the HVAC ventilation tracer smoke (wax impregnated cloth). The hot smoke source was placed inside the DSF to demonstrate that the pollutants were not being removed from the streetscape merely by lift generated by the Bernoulli principle. At time mark 0:02, the hot smoke was seen exiting the DSF wall at the inlet. At time mark 0:04, the DSF fan was turned on. At time mark 0:09, no smoke can be seen exiting the DSF wall at the inlet. At time mark 0:16, the DSF fan was turned off. At time mark 0:23, smoke can again be seen exiting the DSF at the inlet.

In order to determine whether the flow rates of evacuation would be within the range suitable for an integrated biofilter to remediate pollutants, an off the shelf smoke evacuation fan was selected of a size that would fit within the DSF at full scale. Calculations show that the DSF results could be simulated with 14 fans mounted along the top of the DSF and within the face of a typical 50-foot building operating at speeds of 3.76 m/s (Table 2).

TABLE 2

Ventilation Fan Specifications for a Non-Limiting Embodiment of a Fan-Equipped[1] DSF

| Calculations for DSF Evacuation at MAX COMFORT 5 m/s and scaled requirements for fans Fan Dimensions 36" blade diameter | |
|---|---|
| Fan CFM | 17886 |
| Fan m$^3$/s | 8.44 |
| ft$^2$ inlet area of DSF | 258 |
| m$^2$ | 23.97 |
| MAX COMFORT m/s (Fan m$^3$/s*x/23.97) = 5 | 5 |
| Number of Fans: | |
| x = (23.97*S)/Fan m$^3$/s x = 119.85/Fan m$^3$/s | 14 |
| Space required across face of building | |
| 36" fan size ft = (36/12)*# of fans | 42.6 |
| Experimental Results | |
| Scaled Fan Speed m/s Max Speed of inlet for DSF simulation was 3.76 m/s Inlet/Outlet size of DSF was 1 cm × 4 cm simulating 3 ft deep DSF across a 50 ft wide building width in canyon | 3.76 |

[1]Fan is a Canarm Ltd. Brand RB Belt Drive Propeller Upblast Roof Exhaust fan Industrial/Commercial Gen. Applic. CFM Range 6, 261-61,562. 36", 3 Hp, TEFC, 208-230/460 V, 3 Phase, 940 RPM, 17,866 CFM at 0" S.P.

The present disclosure demonstrated that the DSF, with or without the mechanical ventilation assist, can interact with the streetscape level air to improve and enhance mixing at the urban boundary layer and assist in the evacuation of criteria air pollutants from urban street canyons. This façade technology based approach yields the promise and expression of a building DSF that serves a functional purpose beyond natural ventilation, daylighting, and thermal efficiency. This presents a transformative approach to building design, allowing the façade to enhance adjacent airspace and effectively creating a design intervention with the building façade that can remove some of the criteria air pollutants found in these urban street canyon configurations. Optionally, the inclusion of a biofilter enables the further removal of criteria air pollutants such as VOCs and PMs in a manner that simultaneously satisfies the need for nature within the built environment.

Figure 7:
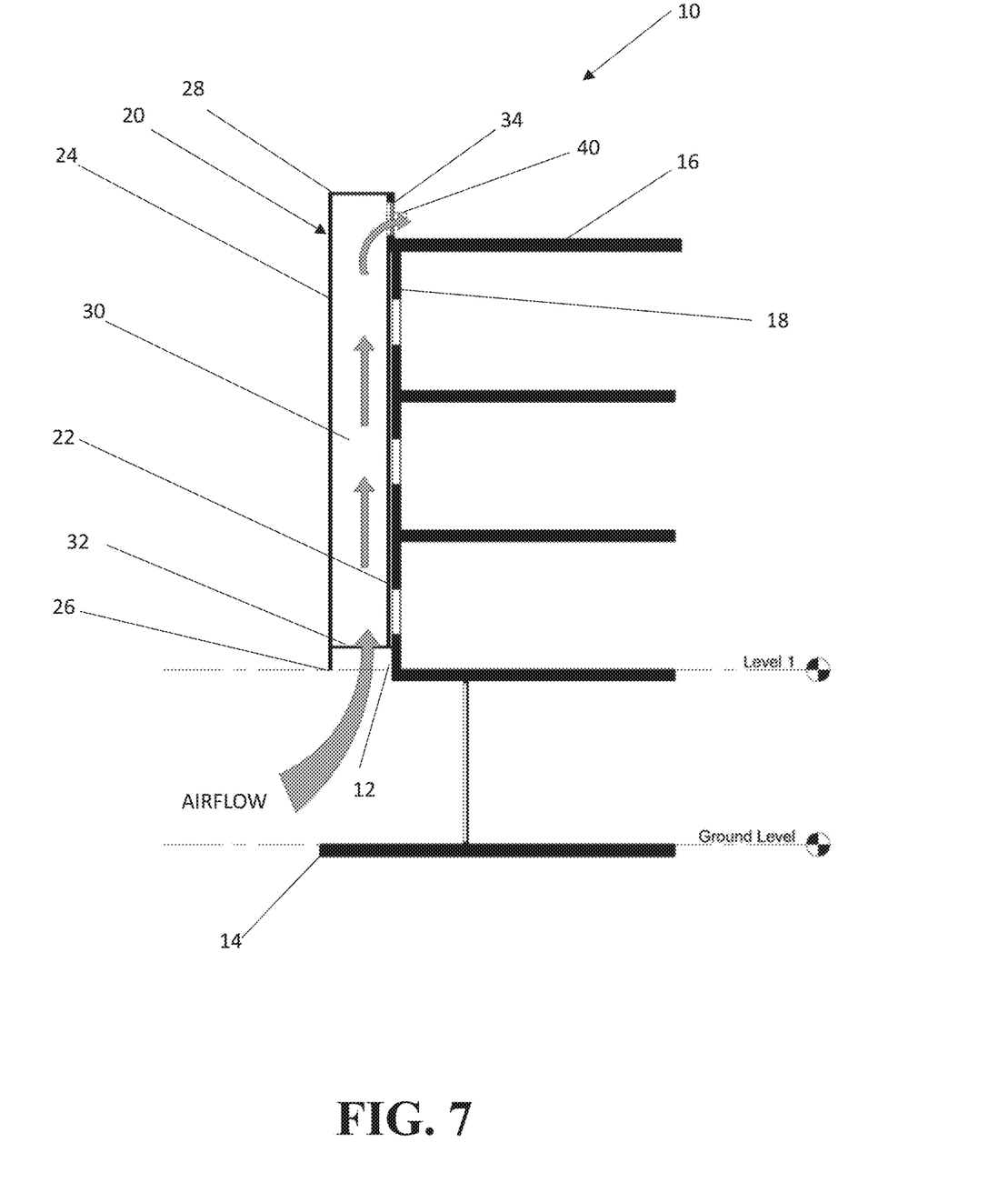
FIG. 7 is a cross-sectional view of a building having a double skin façade associated therewith, wherein the double skin façade is constructed in accordance with the present disclosure.
Figure 8:
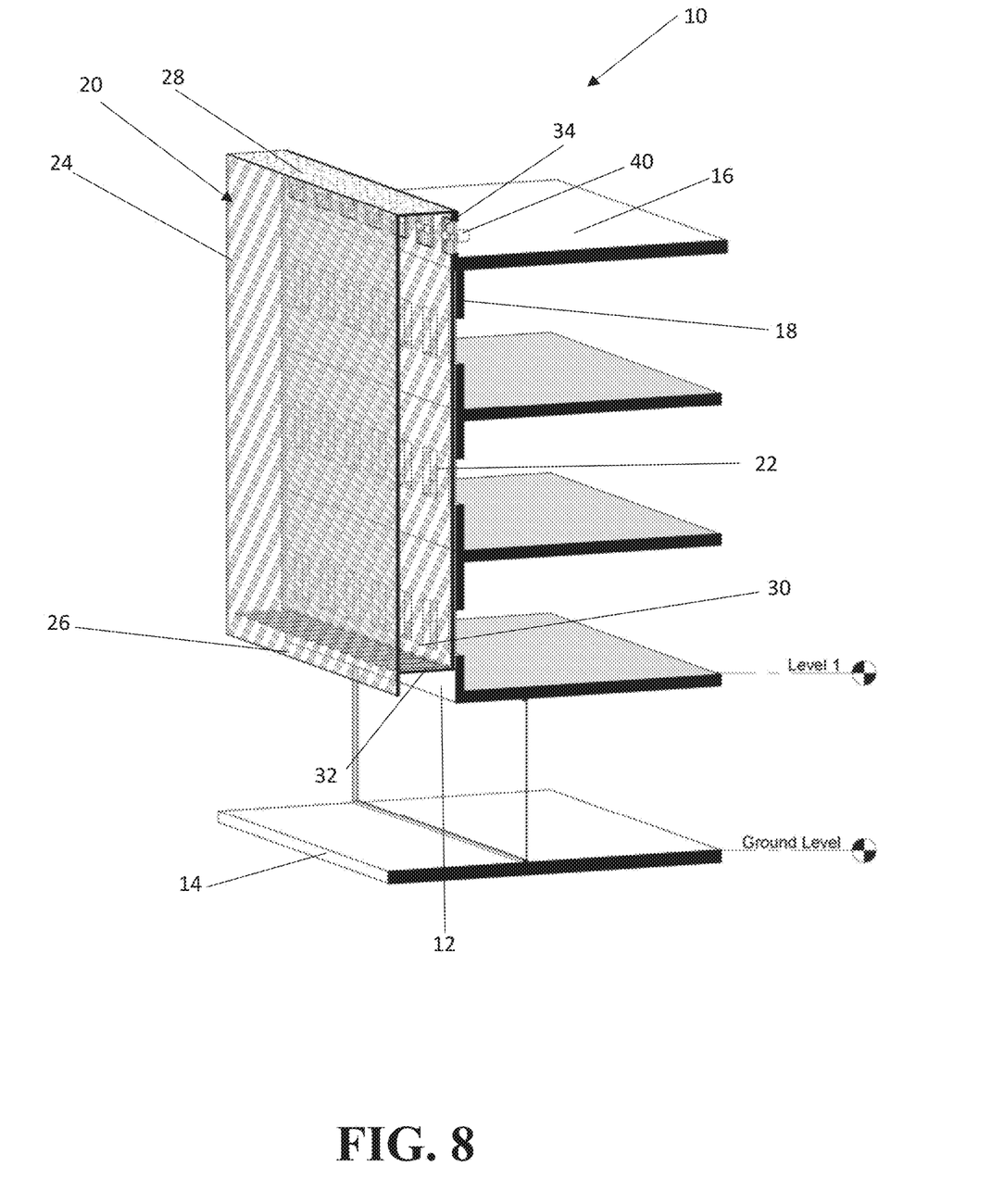
FIG. 8 is another cross-sectional view of the building having a double skin façade of FIG. 7.

FIGS. 7-8 illustrate one non-limiting embodiment of a building 10 having a capability of enhancing quality of the air adjacent the building, in accordance with the present disclosure. The building 10 has an exterior 12, a base 14, and a roof 16, and an upper portion 18 that is substantially adjacent or within close proximity to the roof 16.

The building 10 comprises a double skin façade (DSF) 20 associated with the exterior 12 of the building 10. The DSF 20 comprises a first façade 22 and a second façade 24 facing and substantially parallel to the first façade 22, a lower end 26, an upper end 28, and a gap 30 extending between the first façade 22 and the second façade 24 from the lower end 26 to the upper end 28. The DSF 20 is associated with the building 10 such that the lower end 26 of the DSF 20 is positioned above the base 14 of the building 10. In addition, at least a portion of the lower end 26 of the DSF 20 is open and forms an inlet 32 to allow air adjacent to the exterior 12 of the building 10 to move into the gap 30 between the first and second façades 22 and 24, respectively. Also, at least a portion of the upper end 28 of the DSF 20 is open and forms an outlet 34 through which air and air contaminants are exhausted out to an atmosphere adjacent the upper portion 18 of the exterior 12 of the building 10.

The building 10 further comprises at least one mechanical ventilator 40 positioned adjacent or near the upper end 28 of the DSF 20; the at least one mechanical ventilator 40 is operatively connected to the upper end 28 of the DSF 20. In this manner, when the at least one mechanical ventilator 40 is in an operating mode, the at least one mechanical ventilator 40 drives movement of air in an upward direction toward the upper end 28 of the DSF 20 causing movement of air contaminants from the lower end 26 of the DSF 20, through the gap 30 in the DSF 20, and out through the outlet 34 of the DSF 20, thereby enhancing the air quality adjacent the building 10 by removal of the air contaminants from a street level adjacent the base 14 of the building 10.

Although an illustrative implementation of one or more embodiments are provided herein, the disclosed systems and/or methods may be implemented using any number of techniques, whether currently known or in existence. The disclosure should in no way be limited to the illustrative implementations, drawings, and techniques illustrated herein, including the disclosed exemplary designs and implementations, but may be modified within the scope of the appended claims along with their full scope of equivalents.

What is claimed is:

1. A building having a capability of enhancing air quality adjacent the building, the building comprising:
    a double skin façade (DSF) located on an exterior of the building, wherein the DSF comprises:
        a first façade;
        a second façade facing and substantially parallel to the first façade;
        an upper end;
        a lower end;
        a gap between the first façade and the second façade extending from the lower end to the upper end;
        wherein the DSF is located on the building such that the lower end is positioned above a base of the building, and wherein at least a portion of the lower end is open and forms an inlet that allows air adjacent to the exterior of the building to move into the gap between the first and second façades;
        wherein at least a portion of the upper end is open and forms an outlet through which air and air contaminants are exhausted out to an atmosphere adjacent an upper portion of the exterior of the building; and
    at least one mechanical ventilator positioned adjacent or near the upper end of the DSF and operatively connected to the upper end of the DSF; and
    wherein in an operating mode, the at least one mechanical ventilator drives movement of air in an upward direction toward the upper end of the DSF causing movement of air contaminants from the lower end of the DSF, through the gap in the DSF, and out through the outlet of the DSF, thereby enhancing the air quality adjacent the building by removal of the air contaminants from a street level adjacent the building;
    wherein the at least one mechanical ventilator is (i) a fan or (ii) a heating, ventilation and air conditioning (HVAC) system of the building.

2. A method of enhancing air quality in a street canyon, the method comprising the steps of:
    constructing a double skin façade (DSF) on an exterior of a building on one side of the street canyon, wherein the DSF comprises:
        a first façade;
        a second façade facing and substantially parallel to the first façade;
        an upper end;
        a lower end;
        a gap between the first façade and the second façade extending from the lower end to the upper end;
        wherein the DSF is located on the building such that the lower end is positioned above a base of the building, and wherein at least a portion of the lower end is open and forms an inlet that allows air adjacent to the exterior of the building to move into the gap between the first and second façades;
        wherein at least a portion of the upper end is open and forms an outlet through which air and air contaminants are exhausted out to an atmosphere adjacent an upper portion of the exterior of the building; and
    at least one mechanical ventilator positioned adjacent or near the upper end of the DSF and operatively connected to the upper end of the DSF; and
    causing the at least one mechanical ventilator to be in an operational mode, whereby movement of air is driven in an upward direction toward the upper end of the DSF causing movement of air contaminants from the lower end of the DSF, through the gap in the DSF, and out the outlet of the DSF, thereby enhancing the air quality of the street canyon by removing the air contaminants from a street level adjacent the building;
    wherein the at least one mechanical ventilator is (i) a fan or (ii) a heating, ventilation and air conditioning (HVAC) system of the building.

3. The method of claim 2, wherein the street canyon has an aspect ratio of about 1.0.

4. The method of claim 2, wherein the street canyon has an aspect ratio of about 1.5.

* * * * *